US012639419B2

(12) United States Patent
Ponnuru et al.

(10) Patent No.: US 12,639,419 B2
(45) Date of Patent: May 26, 2026

(54) CLOUD MANAGED CONFIDENTIAL WORKLOAD ERROR RECOVERY AND REPORTING

(71) Applicant: Dell Products L.P., Round Rock, TX (US)

(72) Inventors: Viswanath Ponnuru, Bangalore (IN); Vinay Sawal, Fremont, CA (US); Sumanth Vidyadhara, Bangalore (IN); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 18/410,168

(22) Filed: Jan. 11, 2024

(65) Prior Publication Data

US 2025/0232027 A1      Jul. 17, 2025

(51) Int. Cl.
| | |
|---|---|
| *G06F 21/53* | (2013.01) |
| *G06F 21/00* | (2013.01) |
| *G06F 21/50* | (2013.01) |
| *G06F 21/57* | (2013.01) |
| *G06F 21/60* | (2013.01) |
| *G06F 21/62* | (2013.01) |
| *G06F 21/70* | (2013.01) |
| *G06F 21/71* | (2013.01) |

(52) U.S. Cl.
CPC .............. *G06F 21/53* (2013.01); *G06F 21/00* (2013.01); *G06F 21/50* (2013.01); *G06F 21/57* (2013.01); *G06F 21/60* (2013.01); *G06F 21/62* (2013.01); *G06F 21/70* (2013.01); *G06F 21/71* (2013.01); *G06F 2221/033* (2013.01)

(58) Field of Classification Search
CPC .......... G06F 21/53; G06F 21/00; G06F 21/50; G06F 21/57; G06F 21/60; G06F 21/62; G06F 21/70; G06F 21/71; G06F 2221/033
See application file for complete search history.

(56) References Cited

U.S. PATENT DOCUMENTS 11,081,219 B1 *  8/2021  Dods ....................... G06F 18/22
2024/0223611 A1 *  7/2024  Poornachandran ..... H04L 63/20

OTHER PUBLICATIONS

Intel Corporation, Exception Handling in Intel® Software Guard Extensions (Intel® SGX) Applications, https://cdrdv2-public.intel.com/671544/exception-handling-in-intel-sgx.pdf, 2017 (Year: 2017).*
Nakatsuka et al. CTR: Checkpoint, Transfer, and Restore for Secure Enclaves, https://arxiv.org/abs/2205.15359, 2022 (Year: 2022).*
Jinhua Cui, et al., SmashEx: Smashing SGX Enclaves Using Exceptions. In Proceedings of the 2021 ACM SIGSAC. Conference on Computer and Communications Security (CCS '21), Nov. 15-19, 2021, Virtual Event, Republic of Korea. ACM, New York, NY, USA, 15 pages.

* cited by examiner

*Primary Examiner* — Robert B Leung
*Assistant Examiner* — Howard H. Louie
(74) *Attorney, Agent, or Firm* — Workman Nydegger

(57) ABSTRACT

Confidential workload error recovery and reporting is disclosed. When an exception or other fault or error occurs in a trusted execution environment, context data is collected and stored in a remote access controller. The context data can be analyzed to determine a cause of the exception. The trusted execution environment is recovered based on the analysis of the context information and/or content of the trusted execution environment.

20 Claims, 6 Drawing Sheets

CLOUD MANAGED CONFIDENTIAL WORKLOAD ERROR RECOVERY AND REPORTING

FIELD OF THE INVENTION

Embodiments of the present invention generally relate to trusted execution environments including enclaves. More particularly, at least some embodiments of the invention relate to systems, hardware, software, computer-readable media, and methods for managing workload error recovery and reporting in the context of trusted execution environments.

BACKGROUND

An enclave is an example of a trusted execution environment or is part of a trusted execution environment. Code (or virtual machines, containers, executables, binaries) and data inside of the enclave are encrypted and cannot be read by another process. A trusted execution environment allows data/code to be encrypted/decrypted within a processor and provides memory and data isolation. Trusted execution environments such as enclaves provide a high level of security and can be used to protect both code and data from disclosure or modification. Trusted execution environments use encryption/decryption and may require the use of encryption keys (e.g., public/private keys). A trusted execution environment may be secured using embedded encryption keys and an attestation mechanism to ensure that the keys are available only to authorized code.

A trusted execution environment or enclave, even if software defined, is implemented in hardware. Trusted execution environments are typically configured, as a fundamental security feature, to be stateless by default. This is an example of a design choice to enhance security. Because the trusted execution environment is stateless, sensitive data is less likely to be left behind if the trusted execution environment crashes or is compromised. However, the lack of persistence can present challenges to applications. If a trusted execution environment crashes due to memory encryption errors, exceptions, faults, or other errors/problems, the stateless nature of the trusted execution environment can prevent recovery and may lead to the disclosure or exposure of confidential data.

For example, it has been shown that certain malicious attacks may compromise the confidentiality of an enclave and may result in the disclosure of confidential data, such as described in: SmashEx: Smashing SGX Enclaves Using Exceptions. In Proceedings of the 2021 ACM SIGSAC Conference on Computer and Communications Security (CCS'21), Nov. 15-19, 2021, Virtual Event, Republic of Korea.

BRIEF DESCRIPTION OF THE DRAWINGS

In order to describe the manner in which at least some of the advantages and features of embodiments of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to recovering workloads in trusted execution environments. More particularly, at least some embodiments of the invention relate to systems, hardware, software, computer-readable media, and methods for confidential workload error recovery and reporting in trusted execution environment such as enclaves.

Embodiments of the invention relate to managing confidential error recovery and reporting. In one example, embodiments of the invention store context information of trusted execution environments in exception scenarios. Although embodiments of the invention are discussed in the context of an exception, embodiments of the invention apply to errors or issues in general including any event that may be out of the ordinary operation of the trusted execution environment, such as faults, crashes, attacks or the like.

The context information may facilitate debugging and may aid in understanding the exceptions that have been detected or reported. Further, the context data (or portions thereof) may be collected and serve as a dataset for training a machine learning model to predict exceptions or generate other inferences. This may allow the possibility of an exception to be detected and subsequently avoided.

Embodiments of the more specifically relate to workload recovery and reporting when an exception occurs, is reported, or is detected. When an exception occurs, embodiments of the invention ensure that context information is stored securely, for example in another secure storage. The contents of the enclave or a memory dump related to the exception may be deleted to reduce the likelihood of disclosing or exposing confidential information. The contents may also be stored securely for various purposes including debugging, understanding root cause of the exception, or the like.

The control plane of a cloud service may use the context information to understand the exception, manage the lifecycle of the enclave, and/or allow the confidential workload to be recovered. The context information may also be used as training data to train a machine learning model to detect exceptions, predict the likelihood of a future exception, prevent confidential data from being disclosed/exposed, or the like. Once trained, context information may be provided to the model to monitor the health or operation of the enclave without disclosing confidential information.

Figure 1:
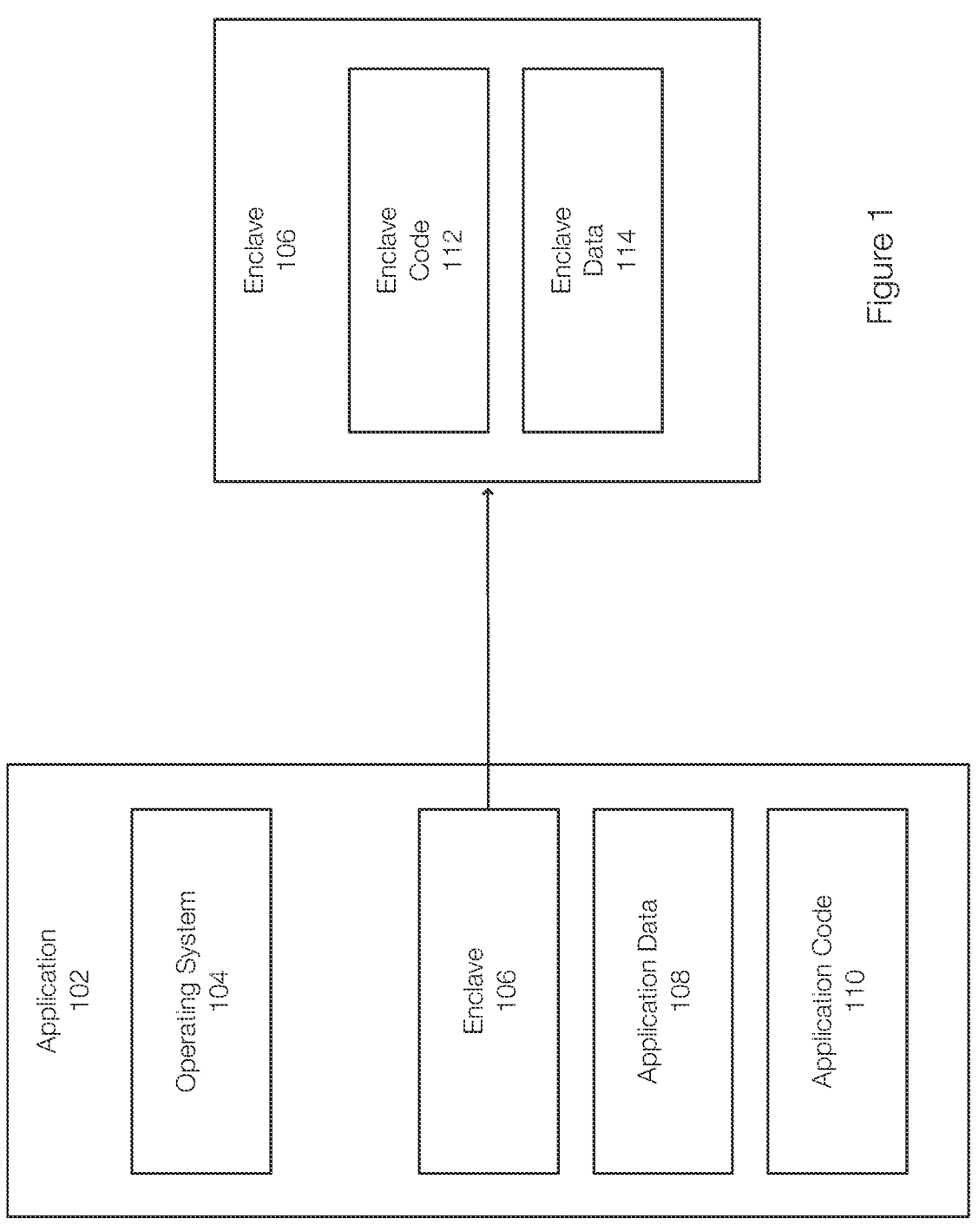
FIG. 1 discloses aspects of an enclave.

FIG. 1 discloses aspects of an enclave. FIG. 1 illustrates an application 102 (or process) that has been allocated resources including an enclave 106 in a computing environment (e.g., in a physical server). The enclave 106 may be created in the processor and/or memory and may be a part of a trusted execution environment. The application 102 may include or have access to an operating system 104 and may also include an enclave 106, application data 108, and application code 110. The enclave 106 is associated with enclave code 112 and enclave data 114. The application 102 is generally representative of processes, images, virtual machines, containers, binaries, executables, or the like that may be deployed to an enclave or trusted execution environment.

In one example, the application 102 may have an untrusted portion and a trusted portion. The trusted or confidential portion of the application 102 may be deployed in the enclave 106. However, an application may be completely within the enclave 106. The untrusted part of the application 102 is not included in the enclave 106. The untrusted portion is untrusted, in one example, in the sense that the untrusted portion is not placed in the enclave 106.

In one example, the untrusted portion of the application 102 may issue a call to the trusted portion of the application 102. Because the trusted portion in the enclave 106 is encrypted, keys or secrets are processed and used such that the function or call included in the enclave code 112 is executed in a processor. The results may be returned to the untrusted portion of the application 102 and/or stored in the enclave data 114. The enclave code 112 and the enclave data 114 are encrypted in one example and decryption occurs within the processor in one example. More generally, decryption/encryption occurs within the enclave 106, which is not accessible by unauthorized entities. In one example, the enclave 106 may include secure portions of a processor and memory.

Generally, an exception is an example of an event that may interrupt the normal operation of an application. Exceptions may occur for a variety of reasons and often result in the generation of an exception object, which may include information about the event that caused the exception. The exception is then handled by an exception handler.

Figure 2:
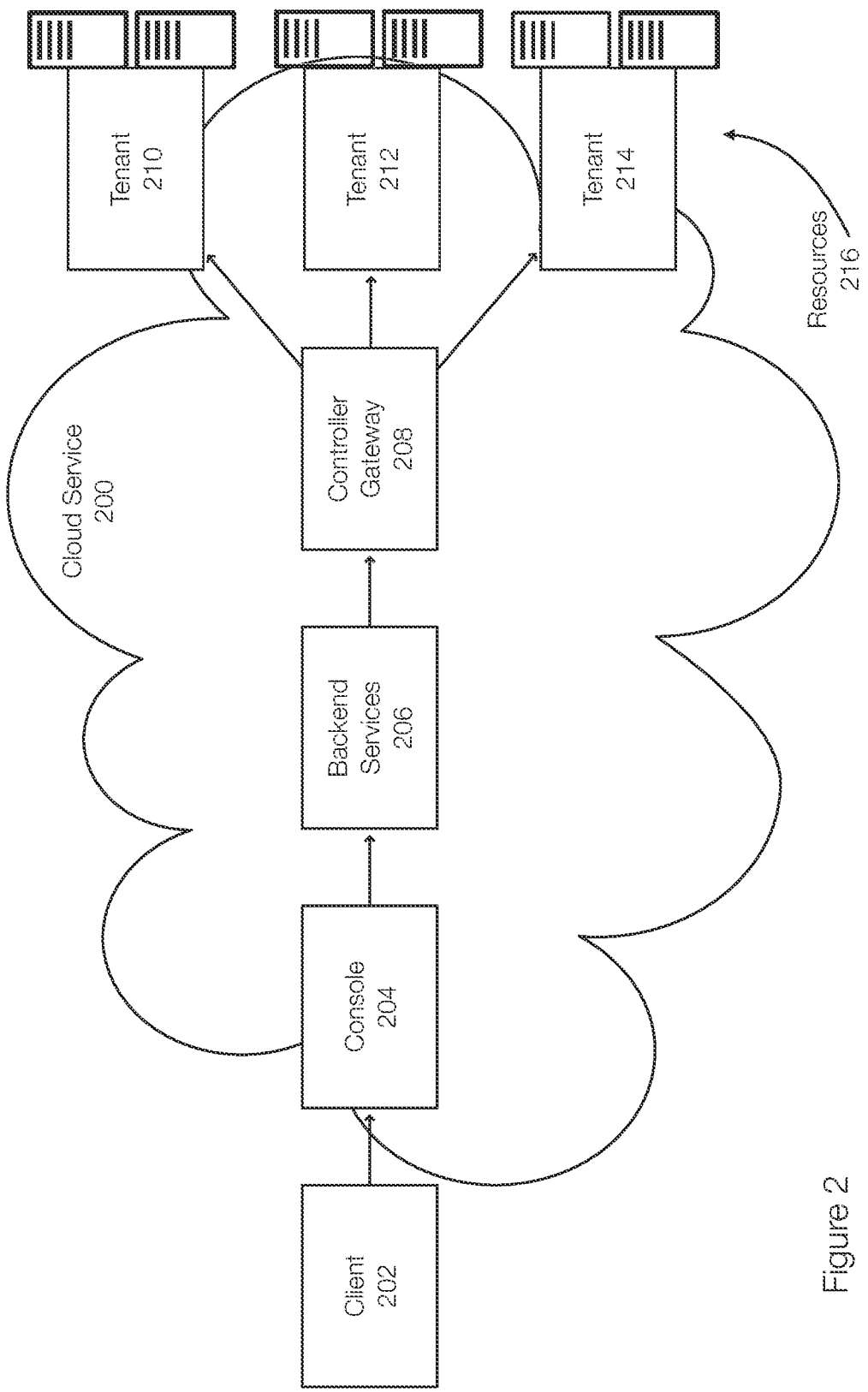
FIG. 2 discloses aspects of a cloud service that provides services to tenants.

FIG. 2 discloses aspects of a cloud service that may provide, by way of example, compute services, storage services, cyber and data protection, cloud platforms, high performance computing device services, trusted execution environments including enclaves, and the like or combinations thereof. DELL APEX is an example of the cloud service 200 that provides various services (e.g., as-a-Service).

In FIG. 2, a client 202 (i.e., a tenant) may access the cloud service 200 and interface with a console 204. The console 204 may allow the client 202 to manage and orchestrate their services that they have acquired or use in the cloud service 200. A tenant, through the client 202, may access the console 204 to discover services, select services and options, deploy or initiate workloads or services, monitor services being provided, or the like.

Through the console 204, the client 202 may initiate services, manage services, provision jobs/workloads, perform backup operations, access storage, or the like. The backend services 206 may execute or perform any requests or commands of the client 202 received through the console 204. A controller gateway 208 may interface the backend services 206 with resources 216. The backend services 206 may access the data or other objects or applications that may be stored in the resources 216.

In one example, the cloud service 200 (or the resources 216) is a multi-tenant cloud or multi-tenant resources. Thus, multiple tenants (e.g., users, entities, organizations) may share the resources 216, which may include servers, storage, memory, or the like. In one example, each tenant may establish one or more enclaves (or trusted execution environments) in the resources 216 for various reasons.

By way of example, each of the tenants 210, 212, and 214 represents tenant premises. Embodiments of the invention relate to provisioning workloads of the tenants in the computing resources (e.g., multi-tenant computing resources).

FIG. 2 further illustrates that some of the resources 216 have been allocated to the tenants 210, 212, and 214 as tenant premises. The allocated resources may configured to include enclaves or the ability to create on-demand enclaves in response to client requests.

Figure 3:
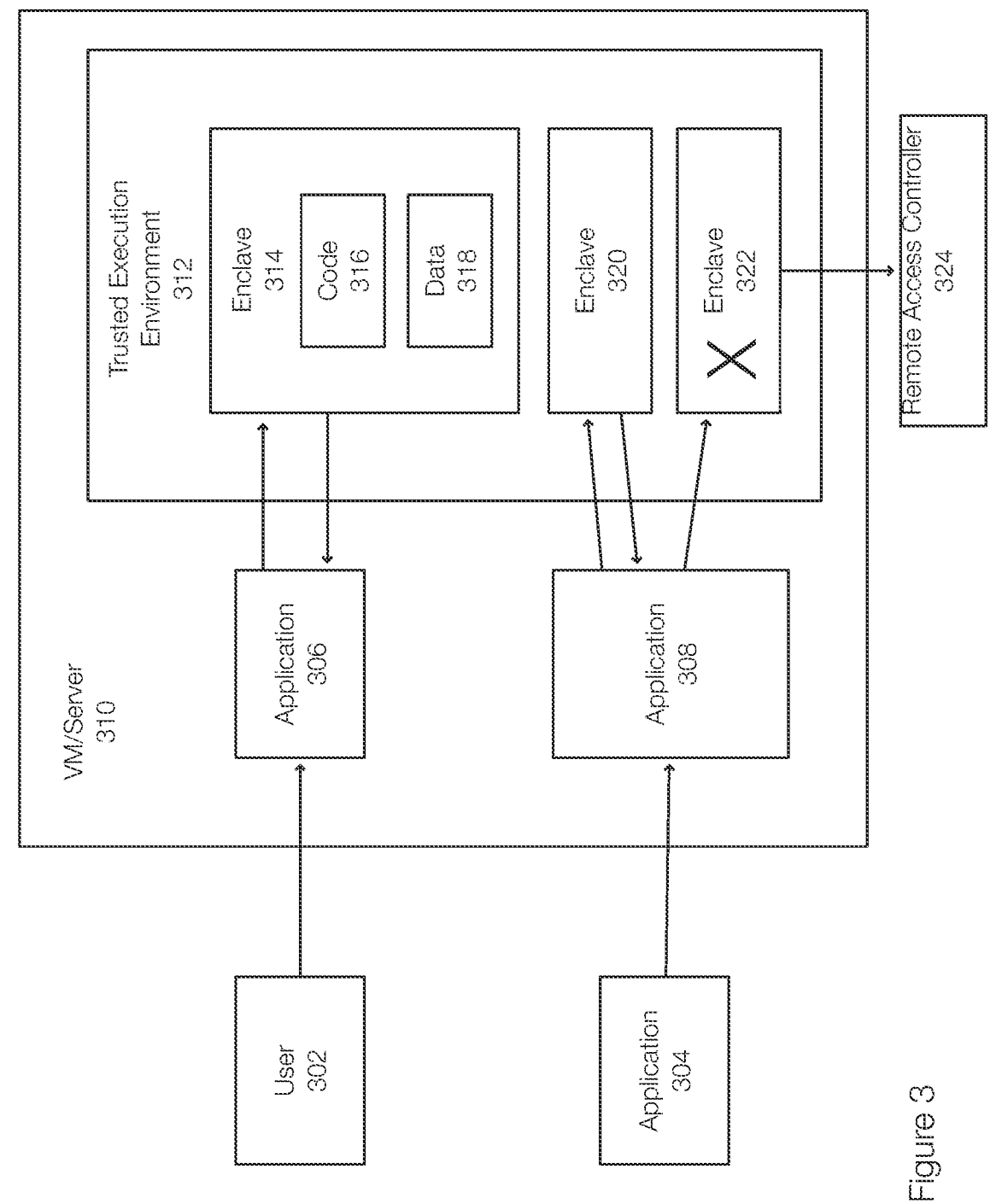
FIG. 3 discloses aspects of an environment that includes trusted execution environments.

FIG. 3 discloses aspects of a trusted execution environment and of a fault or exception that may occur with respect to an enclave. FIG. 3 illustrates a virtual machine or server 310. Applications 306 and 308 are operating or running on the server 310. A trusted execution environment 312 is present on the server 312 and includes enclaves 314, 320, and 322. The enclave 314 includes code 316 and data 318. The other enclaves 320 and 322 may also include code and data.

In this example, a user 302 may interact with an application 306. When necessary, the code 316 or data 318 are used or accessed. In this example, an application 304 may interact with the application 308. The enclaves 320 and 322 are both associated with the application 308. The enclave 320 is operating normally, but the enclave 322 has experienced an exception. The exception may be a crash due to memory encryption errors, faults, a malicious attack, or other unknown errors.

When an exception occurs (e.g., detected, reported), context information may be delivered to a remote access controller 324 and stored in memory specific to the remote access controller 324. The context information, which may include contents of the enclave 324, may be used for recovery, reporting, machine learning training, or the like.

Figure 4:
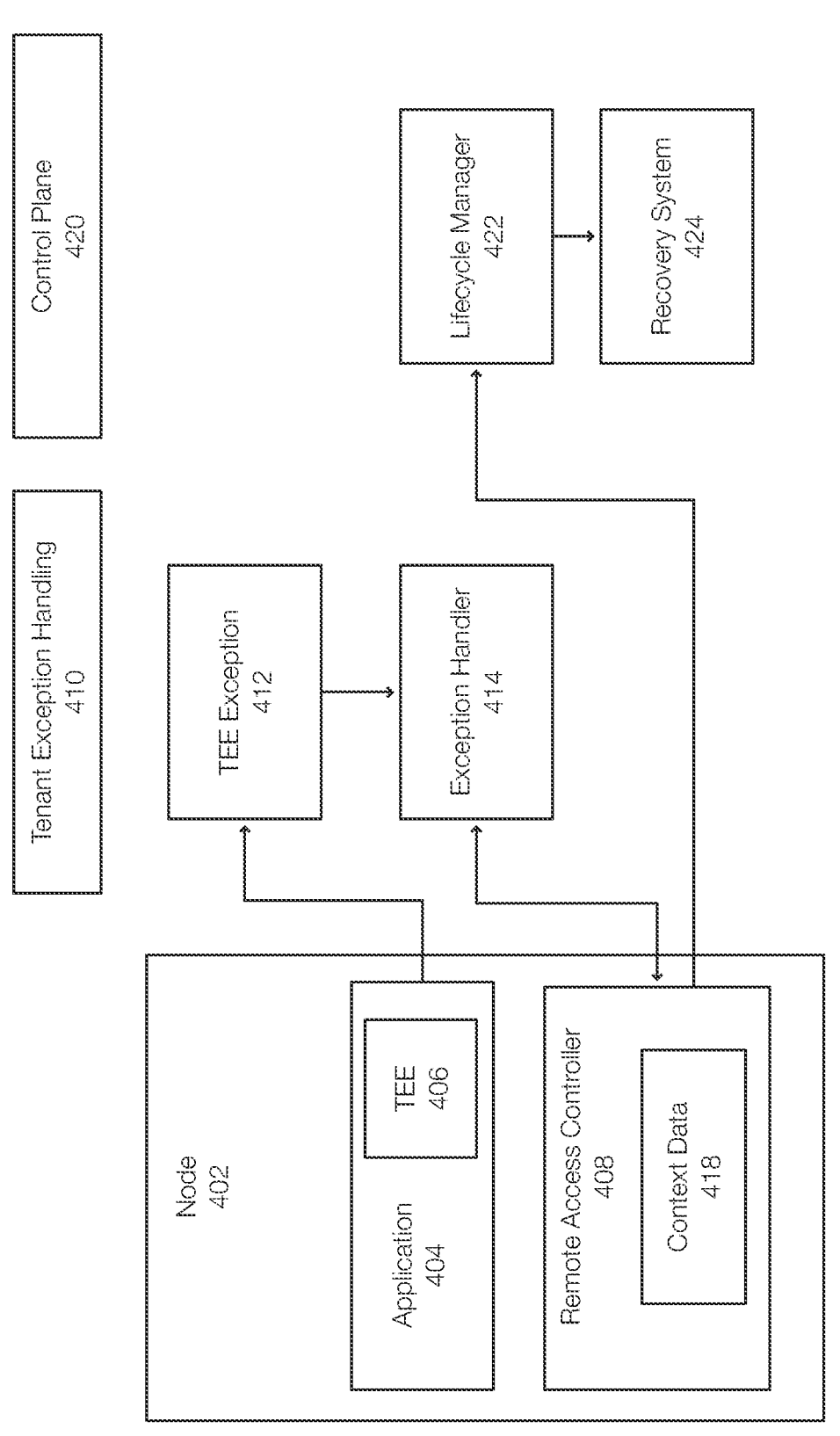
FIG. 4 discloses aspects of confidential workload error recovery and reporting.

FIG. 4 discloses aspects of confidential workload error recovery and reporting. FIG. 4 illustrates an application 404 deployed to a node 402 of computing resources. The node 402 may be a physical server (e.g., PowerEdge server). A trusted execution environment (TEE 406) is associated with the application 404. The node 402 may include or be associated with a remote access controller 408. An iDRAC (Integrated Dell Remote Access Controller) is an example of the remote access controller 408.

Embodiments of the invention include tenant exception handling 410 that may be provided with respect to the TEE 406. When a TEE exception 412 is detected, an exception handler 414 may be invoked. In one example, the exception handler 414 is invoked by a host BIO ACPI (Advance Configuration and Power Interface) call by an iSM (IDRAC (integrated dell remote access controller) service module). In one example, the iSM is the exception handler.

More specifically, tenant exception handling 410 illustrates aspects of handling an exception 412 that occurs at or is generated by the TEE 406. The exception 412 is typically handled by an exception handler 414. The exception handler 414 may collect context data 418 or exception content and store the context data 418 in the remote access controller 408. The exception content 418 may include, but is not limited to, contents of the enclave or trusted execution environment 406, trusted execution environment register content, a context of the node 402, information related to the exception, fault or other errors. The context data 418 may include telemetry data (e.g., data write/read rates to/from the trusted execution environment, memory available in the trusted execution environment, or the like. The context information may also be represented as or include time series data.

In one example, the remote access controller 408 is configured to store the context data 418 internally. The trusted execution environment 406, memory dump, or the like related to the exception is deleted in one example.

The lifecycle manager 422, which may be part of a control plane 420, may access or receive the context data 418. The lifecycle manager 422 may evaluate the context data 418 for its telemetry data, content, and other metadata. By analyzing the context data 418, performing debugging, or the like, the exception of fault can be understood. When possible, a recovery system 424 may restore the workload to the trusted execution environment 406.

In one example, storing the context data 418 in the remote access controller 408 on exception or fault scenarios can prevent the disclosure or exposure of confidential data. Further, the context data 418 allows a recovery strategy to be performed by the recovery system 424 based on an analysis of the context data 418.

Figure 5:
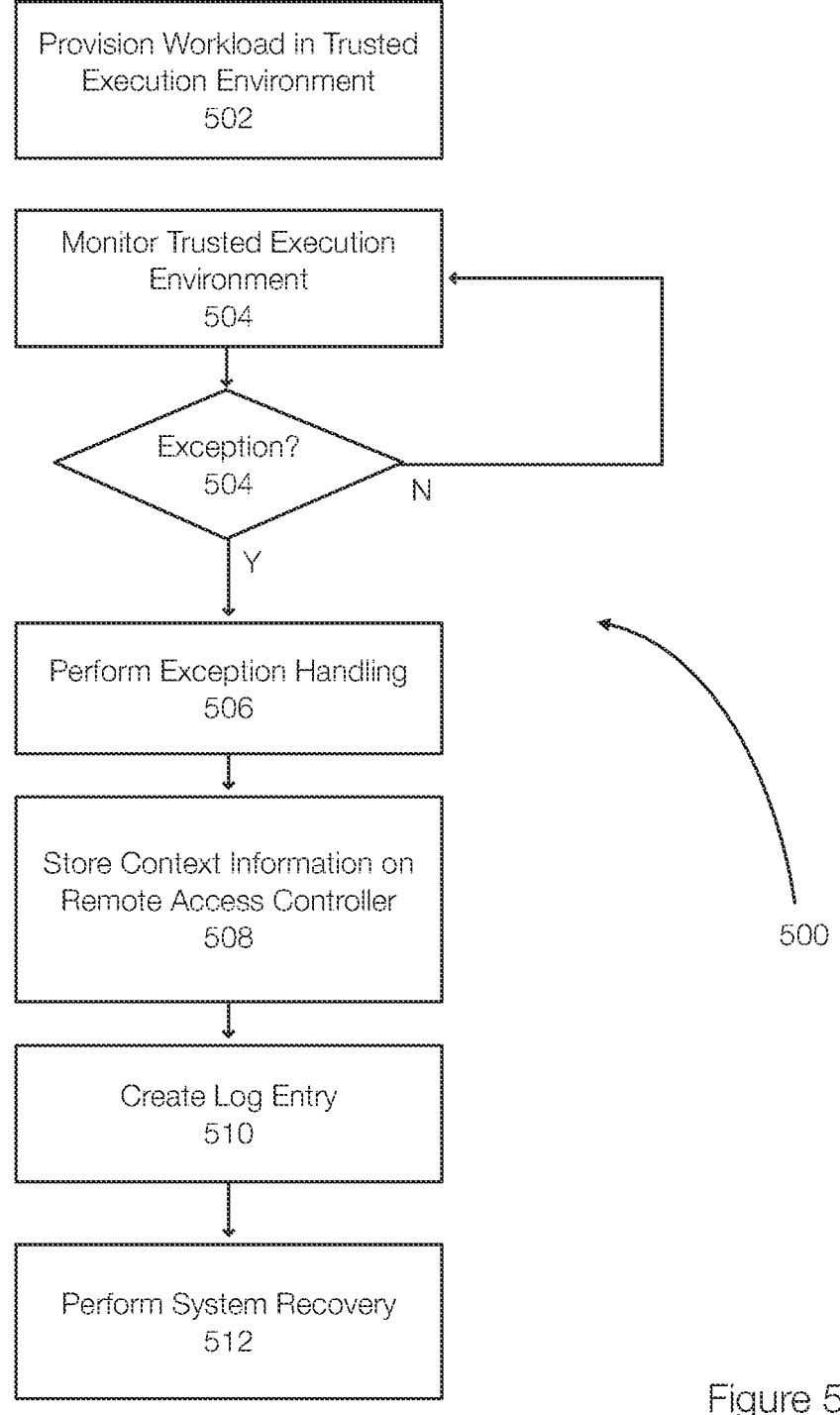
FIG. 5 discloses aspects of a method for confidential workload error recovery and reporting.

FIG. 5 discloses aspects of a method for error recovery and/or reporting for cloud managed confidential workloads. The method 500 may include provisioning a workload in computing resources of a cloud provider. More specifically, the workload may be provisioned 502 in a trusted execution environment. The method 500 then includes monitoring 504 the trusted execution environment. If no exception is detected (N at 504), the trusted execution environment is monitored and the error recovery and reporting operations, or exception handling, may wait for an exception to occur in the trusted execution environment.

If an exception is detected or generated (Y at 504), exception handling in performed 506. The exception handling 506 may include monitoring health locally on the node and acting as a proxy for data collection. The exception handler initiates data transfers of confidential data and context data. More specifically, the exception handler may store 508 context information and confidential information on the remote access controller, which has a separate memory from the trusted execution environment or the node. In addition, a log entry 510 may be created in the remote access controller. In one example, the log entry may include the context data. Next, system recovery is performed 512. The may include subscribing to notifications, which may be generated when the log entry is created. The log entry or context data can be analyzed to determine a reason for the exception. Once the exception is resolved, the trusted execution environment may be restored or recovery from the point at which the exception occurred. Advantageously, the likelihood that confidential data was exposed or disclosed is reduced by handling the exception in accordance with embodiments of the invention.

As apparent from this disclosure, an embodiment of the invention may possess various useful features and aspects, although no embodiment is required to possess any of such features or aspects. An embodiment may comprise cloud-managed services for multiple tenants that may include workload error recovery and reporting, exception handling, exception prevention, or the like.

Following are some further example embodiments of the invention. These are presented only by way of example and are not intended to limit the scope of the invention in any way.

Embodiment 1. A method comprising: monitoring trusted execution environments present in one or more nodes of computing resources, determining that an exception has occurred in a trusted execution environment operating on a node of the one or more nodes, storing context information and content of the trusted execution environment in a remote access controller, and recovering the trusted execution environment based an analysis on the context information and/or context to identify a cause of the exception.

Embodiment 2. The method of embodiment 1, further comprising provisioning a workload in the trusted execution environment created at the node of the computing resources.

Embodiment 3. The method of embodiment 1 and/or 2, further comprising invoking an exception handler when the exception is determined to have occurred.

Embodiment 4. The method of embodiment 1, 2, and/or 3, wherein the exception handler comprises the remote access controller.

Embodiment 5. The method of embodiment 1, 2, 3, and/or 4, further comprising generating a log entry in the remote access controller.

Embodiment 6. The method of embodiment 1, 2, 3, 4, and/or 5, wherein the log entry includes the context information and/or content.

Embodiment 7. The method of embodiment 1, 2, 3, 4, 5, and/or 6, wherein the log entry is configured to enable auditing of the exception.

Embodiment 8. The method of embodiment 1, 2, 3, 4, 5, 6, and/or 7, further comprising generating an inference using a machine learning model trained on historical context information and root causes of exceptions.

Embodiment 9. The method of embodiment 1, 2, 3, 4, 5, 6, 7, and/or 8, wherein the context data includes register context of the trusted execution environment, data area store context, data regarding the exception, and telemetry data surrounding the exception, wherein the telemetry data includes data about the node and data about the trusted execution environment.

Embodiment 10. The method of embodiment 1, 2, 3, 4, 5, 6, 7, 8, and/or 9, wherein recovering the trusted execution environment includes recovering the trusted execution to a point at which the exception occurred, rolling the trusted execution environment to a different point in time, or updating the trusted execution environment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 6:
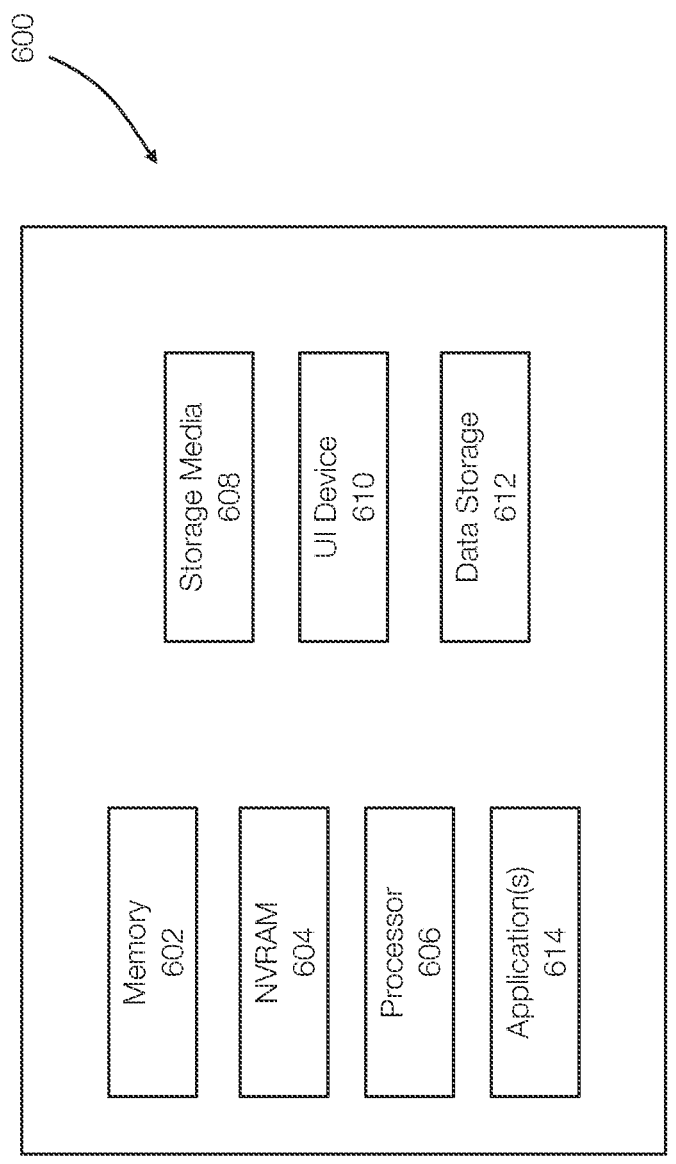
FIG. 6 discloses aspects of a computing device, system, or entity.

With reference briefly now to FIG. 6, any one or more of the entities disclosed, or implied, the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 600 may also be representative of servers, clusters of servers, nodes, or the like. The computing resources represented by the device 600 may represent the computing resources of a cloud provider that can be allocated or used for multi-tenant purposes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

monitoring trusted execution environments present in one or more nodes of computing resources;

determining that an exception has occurred in a trusted execution environment operating on a node of the one or more nodes;

storing context information and confidential enclave content of the trusted execution environment in a memory specific to an out-of-band hardware remote access controller having a processor and an internal memory subsystem that is electrically and logically isolated from both the trusted execution environment and system memory of the node, and separate from the trusted execution environment and separate from memory of the one or more nodes;

transferring the context information and the confidential enclave content to the remote access controller;

deleting the context information and the confidential enclave content stored in the trusted execution environment responsive to confirming storage of the context information and the confidential enclave content in the isolated internal memory subsystem of the remote access controller;

recovering the trusted execution environment based on an analysis of the context information and/or the confidential enclave content to identify a cause of the exception and reconstructing the trusted execution environment on the node using the context information and the confidential enclave content stored in the remote access controller.

2. The method of claim 1, further comprising provisioning a workload in the trusted execution environment created at the node of the computing resources.

3. The method of claim 1, further comprising invoking an exception handler when the exception is determined to have occurred.

4. The method of claim 3, wherein the exception handler comprises the remote access controller.

5. The method of claim 1, further comprising generating a log entry in the remote access controller.

6. The method of claim 5, wherein the log entry includes the context information and/or the confidential enclave content.

7. The method of claim 6, wherein the log entry is configured to enable auditing of the exception.

8. The method of claim 1, further comprising generating an inference using a machine learning model trained on historical context information and root causes of exceptions.

9. The method of claim 1, wherein the context data includes register context of the trusted execution environment, data area store context, data regarding the exception, and telemetry data surrounding the exception, wherein the telemetry data includes data about the node and data about the trusted execution environment.

10. The method of claim 1, wherein recovering the trusted execution environment includes recovering the trusted execution to a point at which the exception occurred, rolling the trusted execution environment to a different point in time, or updating the trusted execution environment.

11. A non-transitory storage medium having stored therein instructions that are executable by one or more hardware processors to perform operations comprising:

monitoring trusted execution environments present in one or more nodes of computing resources;

determining that an exception has occurred in a trusted execution environment operating on a node of the one or more nodes;

storing context information and confidential enclave content of the trusted execution environment in a memory specific to an out-of-band hardware remote access controller having a processor and an internal memory subsystem that is electrically and logically isolated from both the trusted execution environment and system memory of the node, and separate from the trusted execution environment and separate from memory of the one or more nodes;

transferring the context information and the confidential enclave content to the remote access controller;

deleting the context information and the confidential enclave content stored in the trusted execution environment responsive to confirming storage of the context information and the confidential enclave content in the isolated internal memory subsystem of the remote access controller;

recovering the trusted execution environment based on an analysis of the context information and/or the confidential enclave content to identify a cause of the exception and reconstructing the trusted execution environment on the node using the context information and the confidential enclave content stored in the remote access controller.

12. The non-transitory storage medium of claim 11, further comprising provisioning a workload in the trusted execution environment created at the node of the computing resources.

13. The non-transitory storage medium of claim 11, further comprising invoking an exception handler when the exception is determined to have occurred.

14. The non-transitory storage medium of claim 13, wherein the exception handler comprises the remote access controller.

15. The non-transitory storage medium of claim 11, further comprising generating a log entry in the remote access controller.

16. The non-transitory storage medium of claim 15, wherein the log entry includes the context information and/or the confidential enclave content.

17. The non-transitory storage medium of claim 16, wherein the log entry is configured to enable auditing of the exception.

18. The non-transitory storage medium of claim 11, further comprising generating an inference using a machine learning model trained on historical context information and root causes of exceptions.

19. The non-transitory storage medium of claim 11, wherein the context data includes register context of the trusted execution environment, data area store context, data regarding the exception, and telemetry data surrounding the exception, wherein the telemetry data includes data about the node and data about the trusted execution environment.

20. The non-transitory storage medium of claim 11, wherein recovering the trusted execution environment includes recovering the trusted execution to a point at which the exception occurred, rolling the trusted execution environment to a different point in time, or updating the trusted execution environment.

* * * * *